(12) United States Patent
Arackakudiyil Suresh et al.

(10) Patent No.: US 12,644,360 B2
(45) Date of Patent: Jun. 2, 2026

(54) WELLBORE SYSTEMS FOR MONITORING OPERATIONS

(71) Applicant: Halliburton Energy Services, Inc., Houston, TX (US)

(72) Inventors: Zac Arackakudiyil Suresh, Dhahran (SA); Ghulam Jeelani, Dammam (SA)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/638,270

(22) Filed: Apr. 17, 2024

(65) Prior Publication Data

US 2025/0327377 A1 Oct. 23, 2025

(51) Int. Cl.
| | |
|---|---|
| *E21B 41/00* | (2006.01) |
| *E21B 17/02* | (2006.01) |
| *E21B 47/12* | (2012.01) |
| *G01V 1/22* | (2006.01) |
| *G01V 1/42* | (2006.01) |

(52) U.S. Cl.
CPC ...... *E21B 41/0064* (2013.01); *E21B 17/0283* (2020.05); *E21B 47/12* (2013.01); *G01V 1/22* (2013.01); *G01V 1/42* (2013.01); *G01V 2210/1295* (2013.01)

(58) Field of Classification Search
CPC .. E21B 47/12; E21B 41/0057; E21B 41/0064; G01V 1/22; G01V 1/44
See application file for complete search history.

(56) References Cited

U.S. PATENT DOCUMENTS

| | | | |
|---|---|---|---|
| 5,934,373 A | 8/1999 | Warpinski et al. | |
| 7,028,772 B2 | 4/2006 | Wright et al. | |
| 10,030,510 B2 | 7/2018 | Godager et al. | |
| 2005/0055162 A1* | 3/2005 | Gao | E21B 47/13 |
| | | | 702/2 |
| 2007/0215345 A1* | 9/2007 | Lafferty | E21B 47/017 |
| | | | 166/308.1 |
| 2011/0187556 A1* | 8/2011 | Roddy | G01V 15/00 |
| | | | 340/853.3 |

(Continued)

FOREIGN PATENT DOCUMENTS

| | | |
|---|---|---|
| CN | 115506784 | 12/2022 |
| EP | 3622162 | 3/2021 |
| WO | 2010060014 | 5/2010 |

OTHER PUBLICATIONS

"PCT Application No. PCT/US2024/025071 International Search Report and Written Opinion", Jan. 9, 2025, 14 pages.

(Continued)

*Primary Examiner* — Shane Bomar
(74) *Attorney, Agent, or Firm* — DeLizio, Peacock, Lewin & Guerra LLP

(57) ABSTRACT

Wellbore systems include one or more sensing devices configured to sense physical parameters before, during, and/or after fluid injection procedures are performed to inject fluid into a subterranean formation. Seismic vibrations may be induced into the subterranean formation and detected at the injection wellbore or in a remote monitoring wellbore as part of monitoring and evaluation of the fluid injection operations. The one or more sensing devices may also be configured to monitor well production and/or formation conditions in and around a single wellbore and/or in multiple wellbore systems.

14 Claims, 8 Drawing Sheets

(56) References Cited

U.S. PATENT DOCUMENTS

| | | | | |
|---|---|---|---|---|
| 2012/0055669 | A1* | 3/2012 | Levin | E21B 49/00 |
| | | | | 166/250.17 |
| 2013/0081807 | A1* | 4/2013 | Dyer | E21B 47/12 |
| | | | | 166/50 |
| 2013/0087321 | A1* | 4/2013 | Bartko | E21B 41/0035 |
| | | | | 166/66 |
| 2014/0144226 | A1 | 5/2014 | Shanks | |
| 2016/0116617 | A1 | 4/2016 | Yu et al. | |
| 2016/0187525 | A1 | 6/2016 | Wilson et al. | |
| 2017/0081956 | A1 | 3/2017 | Ganguly et al. | |
| 2018/0030824 | A1 | 2/2018 | Roberson et al. | |
| 2018/0128090 | A1 | 5/2018 | Friesen et al. | |
| 2018/0348389 | A1* | 12/2018 | Jaaskelainen | E21B 47/107 |
| 2020/0092199 | A1* | 3/2020 | Freeman | H04L 45/22 |
| 2021/0156233 | A1 | 5/2021 | Cho et al. | |
| 2022/0228451 | A1* | 7/2022 | Jaaskelainen | G01F 1/666 |
| 2022/0333460 | A1 | 10/2022 | Fripp et al. | |
| 2023/0213669 | A1 | 7/2023 | Yu et al. | |
| 2024/0110464 | A1 | 4/2024 | Skeels | |
| 2024/0280002 | A1* | 8/2024 | El Mallawany | E21B 41/0085 |
| 2024/0318539 | A1* | 9/2024 | Steele | E21B 47/008 |

OTHER PUBLICATIONS

Branagan, P.T., "Measuring the Hydraulic Fracture-Induced Deformation of Reservoirs and Adjacent Rocks Employing a Deeply Buried Inclinometer", 1996 SPE Annual Technical Conference and Exhibition, Oct. 6, 1996, 13 pages.
"PCT Application No. PCT/US2024/054225 International Search Report and Written Opinion", Jul. 11, 2025, 11 pages.
"U.S. Appl. No. 18/921,907 Non-Final Office Action", filed Aug. 1, 2025, 10 pages.

* cited by examiner

700

WELLBORE SYSTEMS FOR MONITORING OPERATIONS

TECHNICAL FIELD

The present disclosure relates generally to wellbore operations, and, more particularly, to various embodiments for monitoring wellbore and well system operations.

BACKGROUND

Various subterranean reservoirs, such as wellbores, wellbore networks, and underground spaces such as rock formation material or a subterranean cavity, may be used to store various types of liquids and gases. For example, some subterranean reservoirs may be used for carbon dioxide ($CO_2$) sequestration, which for example may be utilized to secure a space for permanent disposal of $CO_2$ based on meeting various environmental/governmental regulations regarding the handling of $CO_2$. In other examples, a reusable resource, such as hydrogen, may be stored on a temporary basis in a subterranean reservoir, and recovered at a later time for use as needed. In addition, fracking operations may be performed on subterranean formations using fluid injection operations in order to create and/or increase productivity of a wellbore system. Wellbore systems may also be configured to observe the reservoir and monitor production from nearby wells.

BRIEF DESCRIPTION OF THE DRAWINGS

Embodiments of the disclosure may be better understood by referencing the accompanying drawings.

Figure 1:
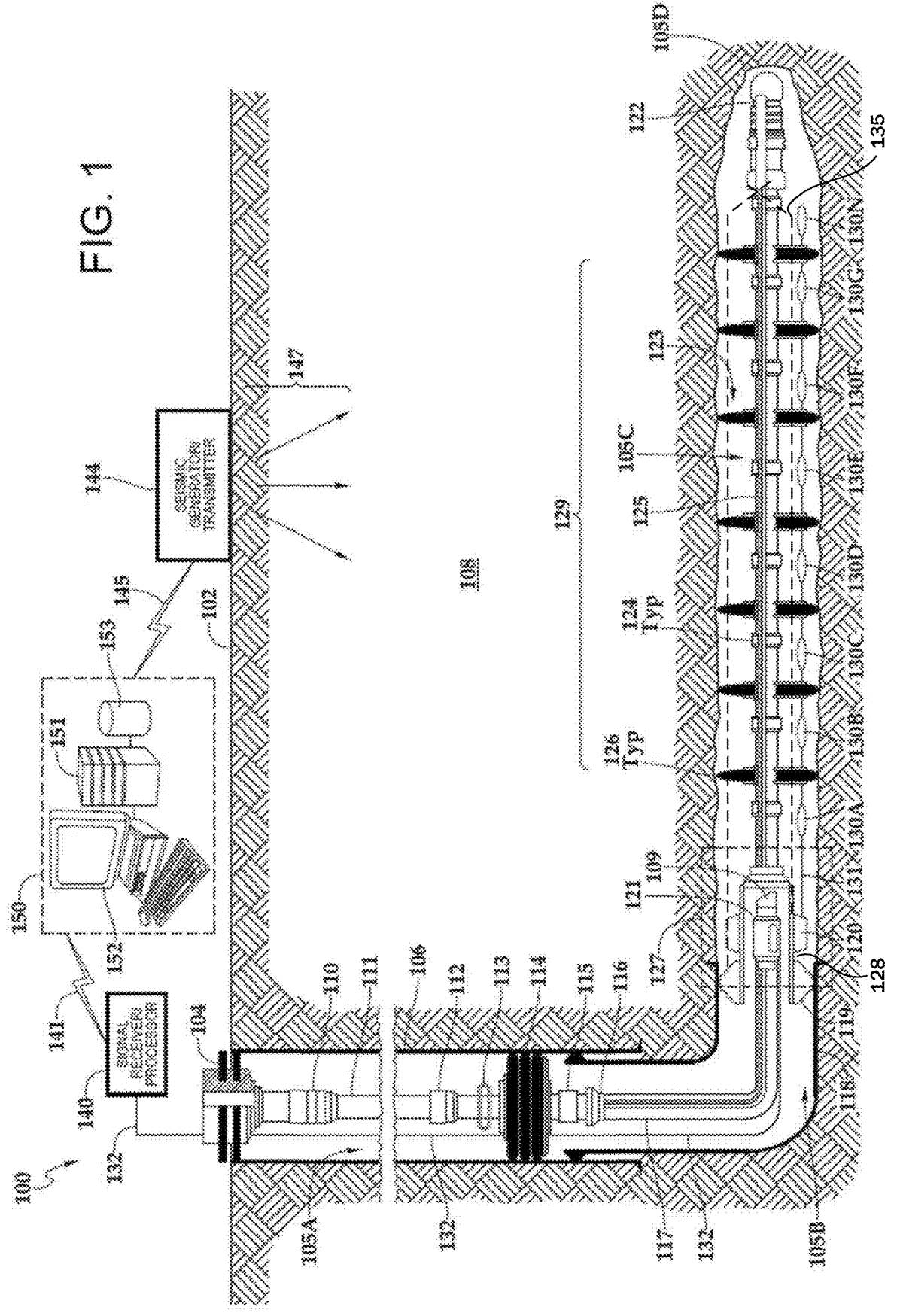
FIG. 1 illustrates a wellbore system including wellbore monitoring apparatus, according to various embodiments.

The drawings are provided for the purpose of illustrating example embodiments. The scope of the claims and of the disclosure are not necessarily limited to the systems, apparatus, methods, or techniques, or any arrangements thereof, as illustrated in these figures. In the drawings and description that follow, like parts are typically marked throughout the specification and drawings with the same or coordinated reference numerals. The drawing figures are not necessarily to scale. Certain features of the invention may be shown to be exaggerated in scale or in somewhat schematic form, and some details of conventional elements may not be shown in the interest of clarity and conciseness.

DETAILED DESCRIPTION

Wellbore systems, including wellbores extending into subterranean formations and subterranean cavities, are often employed to inject a fluid, such as carbon dioxide, into the subterranean formation or cavity for permanent or semi-permanent storage. For example, the global Carbon Capture, Utilization, and Storage (CCUS) market is poised for significant growth, driven by the urgent need to decarbonize industries and achieve net-zero emissions goals. In other examples, fluid injection into a wellbore system or subterranean cavity may be used to store a commodity, such as elemental hydrogen (H2), on a temporary basis and for later retrieval.

CCUS projects are becoming more prevalent, and use of various gauges have been proven useful for temperature and pressure monitoring during CO2 injection procedures. However, better systems, methods, and techniques for monitoring these fluid injection procedures will help reduce costs and increase the overall efficiency of these procedures. Improved processes can be achieved by the use of additional sensing devices, such as geophones, hydrophones, acoustic sensors, water cut sensors, temperature and pressure sensors. which provide additional information about formations and the fluid injection procedures and/or other operations being performed on a formation using a wellbore system.

Once such sensing device is a geophone. A geophone offers advantages to CCUS injection wells in addition to temperature and pressure monitoring. A downhole geophone is a type of geophone that is deployed in a borehole to record seismic waves transmitted into a formation. Downhole geophones are used to improve the resolution and accuracy of seismic imaging, as well as to monitor reservoir changes over time. Downhole geophones can be either point sensors that measure the motion at a specific depth, or distributed sensors that measure the motion along a cable. Behind the casing geophone that can be connected to the surface via inductive coupling will provide customer with real time understanding of the reservoir and CO2 injection. Currently, behind the casing use of geophones without inductive coupling is not possible. Further, in examples of CCUS wells where a 7" liner is used inside a 9⅝" casing, it is difficult (not possible today) to get geophone sensors behind the 7" casing to measure seismic readings.

The description that follows includes example systems, methods, techniques, and program flows that embody aspects of the disclosure. Various embodiments of the systems, methods, and techniques described herein provide benefits including one or more of the following:

Tubing encapsulated conductor or other forms of communication cable run behind the casing connecting various sensors.

Inductive coupling technology to communicate with geophones and other sensors that are placed behind the casing.

Placing multiple geophones in a single communication line behind the casing.

Placing Quartz sensors, geophone and other sensors in a single communication line.

Real time monitoring and analysis of seismic changes as a result of CO2 injection or other activities.

Although described with respect to fluid injection operations, the systems, apparatus, methods and techniques as described herein are also applicable for using in observing subterranean reservoir(s) and/or for monitoring a production well and/or from monitoring nearby wells in multi-well systems. Embodiment of the systems, apparatus, methods, and techniques as described herein may be configured for use in monitoring the sand at an intake screen utilized in a production well.

In various embodiments described herein, the geophone, hydrophone nodes will have a hybrid electronics that will allow it to communicate using the same Tubing Encapsulated Conductor line as used by the quartz gauges. In various embodiments, a surface interrogator, such as a computer system, will query quartz gauges, hydrophones and the geophones for their readings as and when required. Use of geophones and other sensors in conjunction with inductive coupling technology that is currently available for the distributed quartz sensors will allow for monitoring the reservoir behind the casing. Communication between the sensors and surface system can be either full duplex or half duplex.

It would be understood that embodiments of this disclosure may be practiced without these specific details. For instance, this disclosure refers to use of carbon dioxide ($CO_2$) and hydrogen ($H_2$) in illustrative examples. Aspects of this disclosure can also use other types of gases and fluids. In other instances, well-known instruction instances, protocols, structures, and techniques have not been shown in detail in order not to obfuscate the description. Embodiments of this disclosure can also be used to detect sands detection at screens.

Further, while the wellbores as illustrated and described in the figures of this disclosure are shown as comprising a vertically oriented borehole and/or as a vertically oriented borehole coupled to a horizontally oriented borehole, embodiments of wellbores where the systems and methods as described in this disclosure may be deployed are not limited to wellbores having any particular orientation, and may include vertical, horizontal, and/or inclined wellbores, and combinations of these, including wellbore systems including one or more branches coupled to a main, a secondary, or other network(s) of a wellbore.

Unless otherwise specified, use of the terms "up," "upper," "upward," "uphole," "upstream," or other like terms shall be construed as generally away from the bottom, terminal end of a well; likewise, use of the terms "down," "lower," "downward," "downhole," or other like terms shall be construed as generally toward the bottom, terminal end of the well, regardless of the wellbore orientation. Use of any one or more of the foregoing terms shall not be construed as denoting positions along a perfectly vertical axis. In some instances, a part near the end of the well can be horizontal or even slightly directed upwards. Unless otherwise specified, use of the term "subterranean formation" shall be construed as encompassing both areas below exposed earth and areas below earth covered by water such as ocean or fresh water.

Throughout this disclosure the terms "proximal" and "distal" are used to refer to a particular end potions of a device or elements, such as a tubing or a borehole, which extend for some distance in a colinear or parallel direction relative to a longitudinal axis of the wellbore. The term "proximal" or "proximal end" refers to the end portion of the device or element that is closest to the wellhead of a wellbore when measured along the longitudinal axis of the wellbore and regardless of the actual distance from the wellhead. The term "distal" or "distal end" refers to the end portion of the device or element that is closest to the terminal end of a wellbore when measured along the longitudinal axis of the wellbore and regardless of the actual distance from the terminal end of the wellbore.

FIG. 1 illustrates a wellbore system (system) 100, including wellbore monitoring apparatus, according to various embodiments. System 100 includes an upper wellbore 105A extending from a surface 102 of formation 108, and in a generally vertical direction into the formation. Upper wellbore 105A is enclosed by an upper casing 106, which is sealed to a wellhead cap 104 at surface 102. The wellbore of system 100 continues in a generally vertical direction below the distal end of upper casing 106 for a distance, and then turns to a generally horizontal orientation, as represented by intermediate wellbore 105B. The vertical portion and the horizontal portion of the intermediate wellbore 105B are enclosed in middle casing 118. The wellbore of system 100 further extends distally of the distal end of the middle casing 118 in a generally horizontal orientation as the lower wellbore 105C to the terminal end 105D of the wellbore. As shown in FIG. 1, lower wellbore 105C extends from the distal end 109 of the middle casing 118 to the terminal end 105D of the wellbore, and is not enclosed by a casing, as represented by wellbore 105C in FIG. 1 extending through an open or uncased portion of formation 108. The outer walls of the portion of the wellbore represented as lower wellbore 105C may be formed by formation 108, having portions of the lower wellbore 105C open to and in direct contact with formation 108.

As shown in FIG. 1, system 100 includes one or more additional devices location within and/or extending through one or more portions of the wellbore. Embodiment of system 100 include an upper tubing 111 extending between wellhead cap 104 and a packer 114 positioned near the distal end of the upper casing 106, wherein upper tubing 111 is enclosed within the upper casing 106. Upper tubing 111 may be coupled to Tubing Retrievable Safety Valve (TRSV) 110 and the wellhead cap 104 near the proximal end of the upper tubing, and coupled to Sliding Slide Door (SSD) 112 and splice sub 113 located just proximal of packer 114. In various embodiments, packer 114 seals the annulus outside of upper tubing 111 and inside of the upper casing 106 at or near the distal end of upper casing 106. Upper tubing 111 includes an inner fluid passageway that provides fluid commination for a fluid introduced at the wellhead cap 104, through packer 114, and to an intermediate tubing 117 that extends from packer 114 at the proximal end of the intermediate tubing 117 to the distal end 109 of the intermediate tubing 117, wherein distal end 109 is positioned at or near the distal end of the middle casing 118. A coupler 116 may be used to couple the distal end of upper tubing 111 to the proximal end of intermediate tubing 117. In various embodiments, packer 115 seals the distal end of casing 106 to the proximal end of intermediate casing 118. In various embodiments, a packer 119 seals the distal end 109 of the middle casing 118 from the annulus surrounding the intermediate tubing 117 and from the open portion of the lower wellbore 105C.

In various embodiments, system 100 includes a distal tubing 125 that extends from the distal end of intermediate tubing 117 to the landing nipple and float shoe (shoe) 122 positioned at the distal end of the distal tubing 125. Shoe 122 may seal the inner passageway extending through distal tubing 125, and be positioned near the terminal end 105D of the portion of wellbore 105C. The proximal end of distal tubing 125 is coupled to the distal end of intermediate tubing 117 at the coupler illustrated within dashed box 127 (hereinafter "coupler 127), and wherein a fluid passageway extending through the distal tubing 125 is in fluid communication with a fluid passageway extending through the intermediate tubing 117, which in turn is in fluid communication with the fluid passageway extending from the wellhead cap 104 through the upper tubing 111. As a result, a fluid passageway is provide for a flow of fluid that is input at wellhead cap 104 to pass through the upper tubing 111, the intermediate tubing 117, and into the fluid passageway extending through the distal tubing 125.

As further illustrated in FIG. 1, the distal tubing 125 of system 100 may be separated into a plurality of injection zones 129. Injection zones 129 may be spaced along the distal tubing 125 and having the portions of the annulus 123 that encircles the outside of the distal tubing 125 and located within wellbore 105C being separated from one another by a plurality of packers 126. Various potions of distal tubing 125 include fluid control ports 124 positioned along the distal tubing 125, in various embodiments having one or more of the fluid control ports positioned within a particular one of the injection zones 129, and configured to be controllably operated to provide a pathway for fluid flow from the fluid passageway extending through the distal tubing 125 to the particular injection zone where the fluid control ports 124 is located. In various embodiments, each of the fluid control ports 124 is configured to be controllably operated to provide the pathway for the flow of fluid on an individual basis, and/or in conjunction with the operation of one or more other fluid control ports in order to control which of the injection zones 129 are operated to provide the fluid pathway between annulus 123 and the injection zone where the particular fluid control port is located. In various embodiments, all of the fluid control ports 124 may be operated in unison to provide a pathway for fluid to flow from the fluid passageway extending within the distal tubing 125 to the annulus 123 of each plurality of fluid injection zones 129 in a simultaneous manner.

In various embodiments, one or more sensing devices 130A-130N are positioned within the annulus 123 extending through the portion of lower wellbore 105C, and outside of the distal tubing 125. Sensing devices 130A-130N are not limited to any particular type or types of sensing devices, and may include sensing devices configured to sense one or more physical parameters, such as but not limited to temperature, pressure, seismic vibrations, and chemical elements and compositions that may be present at the sensing devices and/or occurring in the formation 108. The type of devices included as the one or more sensing devices 130A-130N may include but are not limited to geophones, hydrophones, temperature sensors, pressure sensors, chemical sensors, quartz pressure and temperature sensors, acoustic sensors, and/or water cut sensors.

In various embodiments, each of the sensing devices 130A-130N is configured to sense one or more physical parameters present within the lower wellbore 105C and/or within formation 108, and provide an output signal or signals, such as electrical output signal(s), which are representative of the one or more sensed parameters. As shown in FIG. 1, the one or more sensing devices 130A-130N may be communicatively coupled through lower communication line 131 to a lower transceiver 120.

In various embodiments, the sensors will each have a hybrid electronics module that converts the sensor information which could be analog in nature to communication signal which can be electrical in nature. Communication can also be digital or optical in nature. Communication from the surface will utilize a single communication line and use a uniform communication protocol across all the various sensors that are connected to the single communication line.

In various embodiments, lower transceiver 120 is positioned within coupler 127, and outside both intermediate tubing 117 and distal tubing 125. An intermediate transceiver 121 is also positioned within the coupler 127, and outside of the intermediate tubing 117 but inside the outer shell 128 extending from the proximal end of the distal tubing 125 and isolated from the annulus surrounding the intermediate tubing 117. Intermediate transceiver 121 is configured to be inductively coupled to lower transceiver 120 so that the signals being provided to lower transceiver 120 from sensing devices 130A-130N can be wirelessly transmitted to intermediate transceiver 121. The inductive coupling between lower transceiver 120 and intermediate transceiver 121 allow for the transmission of signals representative of the parameters sensed by sensing devices 130A-130N to be couple to the intermediate transceiver 121 without the need for a physical connection, such as an electrical or optical bus or cable, while allowing the sensing devices 130A-130N to be physically positioned outside of the distal tubing 125 and within the annulus 123 extending through the lower portion of the wellbore 105C. Communication protocols include one way communication, half duplex or full duplex communication. Embodiments can also include instruments that convert optical signals to electrical signals and back to optical signals so that information may be transferred wirelessly through the inductive coupling.

In various embodiments, the intermediate transceiver 121 is communicatively coupled, for example via a communications link 132, to a signal receiver/processor 140. Communication link 132 may be any type of link, such as electrical or optical bus or cable capable of communicating signals from the intermediate transceiver 121 to the signal receiver/processor 140. Signal receiver/processor 140 is configured to receive the signal transmitted for the intermediate transceiver 121 by communication link 132, which includes the signal representative of the parameters sensed by sensing devices 130A-130N. In various embodiments, signal receiver/processor 140 is configured to provide one or more signal processing functions, such as but not limited to signal amplification, noise and/or frequency filtering, and analog to digital signal conversions. As shown in FIG. 1, signal receiver/processor 140 is communicatively coupled to a computer system 150, as represented by lightning bolt 141, wherein the signals received at signal receiver/processor 140 may be communicated to computer system 150 for further processing, recordation, and/or for analysis purposes. Computer system 150 may include one or more processors 151 coupled to one or more input/output devices 152, such as a computer monitor, mouse, and/or a keyboard, which allow a user, such as a field technician or engineer, to interact with computer system 150. In various embodiments, the one or more processors 151 are configured to process the signals received from the signal receiver/processor 140, and to operate on these signal to generate data related to the status of system 100, and for example to display the generated data on the computer monitor for viewing by a user. Further, computer system 150 may be configured to allow the user to provide inputs to the computer system 150, for example using the computer mouse, keyboard, and/or the computer monitor as a touch screen, in order to request data from the system and/or to input operational parameters into the system 100.

Embodiments of system 100 include a seismic generator/transmitter 144 that may be in communication with computer system 150, as represented by lightning bolt 145, and in various embodiments is controlled by instructions provided to the seismic generator/transmitter 144 from computer system 150. Various operating paraments for operation of the seismic generator/transmitter 144 may be provided by computer system 150 based on inputs to computer system 150 determined by a user and then input into computer system 150 by the user. Seismic generator/transmitter 144 in various embodiments is located above surface 102, and is configured to generate and transmit into formation 108 seismic vibrations 147. The frequency and/or frequencies of the seismic vibrations are not limited to a particular frequency and in various embodiments may range from 1 to 120 Hertz, inclusive. In various embodiments, the duty cycle of the seismic vibrations may be one hundred percent, i.e., continuously applied, and in alternative embodiments may have a pulsed or duty cycle of less than one hundred percent. The amplitude of seismic vibrations may varies as well depending of various factors, and typical sensitivity values ranges from 10 V/m/s to 100 V/m/s, inclusive.

These sensed seismic vibrations transmitted from the seismic generator/transmitter 144 into formation 108 may be sensed by the one or more sensing devices 130A-130N, wherein the sensed seismic vibrations may provide information about physical properties of the formation, and also about the progress of one or more fluid injection or fracturing operations being performed on the formation using the wellbore of system 100.

In various embodiments, the sensed seismic vibrations transmitted into the formation 108 are detected by the one or more sensing devices 130A-130N, which in turn generate output signals, such as electrical signals representative of the sensed seismic vibrations. The output signal are transmitted through the inductive coupling formed between lower transceiver 120 and intermediate transceiver 121, and then transmitted to the signal receiver/processor 140 for further processing. The detection and transmission of the output signals representative of the detected seismic vibrations may be performed in real-time, and/or recorded for example using database 153, over a period of time. In various embodiments, seismic generator/transmitter 144 is a unit configured to be positioned at a fixed and/or permanent location. In other embodiments, the seismic generator/transmitter 144 is configured as a mobile unit, such as a seismic truck.

In operation, system 100 is configured so that a fluid, such as carbon dioxide, which is to be injected into formation 108 is provided at wellhead cap 104, and injected under pressure into the fluid passageway of upper tubing 111. The fluid flows downhole through the fluid passageway of upper tubing 111 and through the inner passageway of intermediate tubing 117, and finally into the fluid passageway extending through distal tubing 125. At various points along distal tubing 125 the fluid control ports 124 allow the fluid provided within the inner passageway of the distal tubing 125 to exit from the lower tubing through one or more of the fluid control ports, and to be injected into the formation 108, for example in one of the injection zones 129 associated with one or more of the fluid control ports 124 that is operated to be in an open configuration. In various embodiments, during the fluid injection operations the seismic vibrations 147 that are being generated by the seismic generator/transmitter 144 are transmitted into the formation 108.

Seismic vibrations traveling though the formation 108 are detected by the one or more sensing devices 130-130N, wherein the one or more sensing devices generate signals, such as electrical signals, which are then transmitted to the signal receiver/processor 140 at the surface using the inductive coupling provided by the lower transceiver 120 and the intermediate transceiver 121 located within the coupler 127. The signals received and/or processed at the signal receiver/processor 140 can be communicated to the computer system 150, where various data processing on the signal may be performed in order to generate desired information regarding the status of the formation 108 and the fluid injection operation being performed using system 100.

Although system 100 as described above includes sensing devices 130A-130N as positioned in an open portion of the wellbore, in various embodiments one, some, or all of the sensing devices 130A-130N may be positioned outside of a lower casing, as represented by dashed line 135 in FIG. 1, and wherein the area outside of the lower casing where one, some or all of the sensing devices 130A-130N are positioned is filled with cement to secure the lower casing in place.

The use of geophones and/or hydrophones as sensing devices 130A-130N for downhole monitoring application in injection wells provides advantages including but not limited to:

Hydrophone signals can be used to characterize injection profiling of any injection fluid, including CO2 injection.

Hydrophone signals may be used for any well integrity diagnostic application, such as packer/plug sealing, flow behind casing/tubing etc.

Permanent installation of a geophones array as one or more of sensors 130A-130N can be used for passive/micro-seismic monitoring during and/or after the injection phase of a fluid injection operation.

Although system 100 as described above is configured for use in fluid injection operations, system 100 may be configured for other and/or additional wellbore operations, such as a monitoring operation and/or as a production well. As a monitoring well, the one or more sensors may provide data regarding the reservoir in the area around the wellbore, as well as parameters related to nearby injection operations. When utilized as a production well, the one or more sensors may be configured to provide data related to oil production, water cut, sand blockage at intake screens included as passageways, such as ports 124 when used as intakes to the fluid passageway of the distal tubing 125. Control over any of the operations being performed by system 100, including control over various parameters such as fluid composition, fluid injection pressure, and/or fluid injection temperature, and/or starting and stopping various wellbore operations may be monitored, maintained, and/or adjusted based at least in part on the output signals and/or data derived from the output signal(s) provided by the one or more sensing devices 130A-130N.

Figure 2:
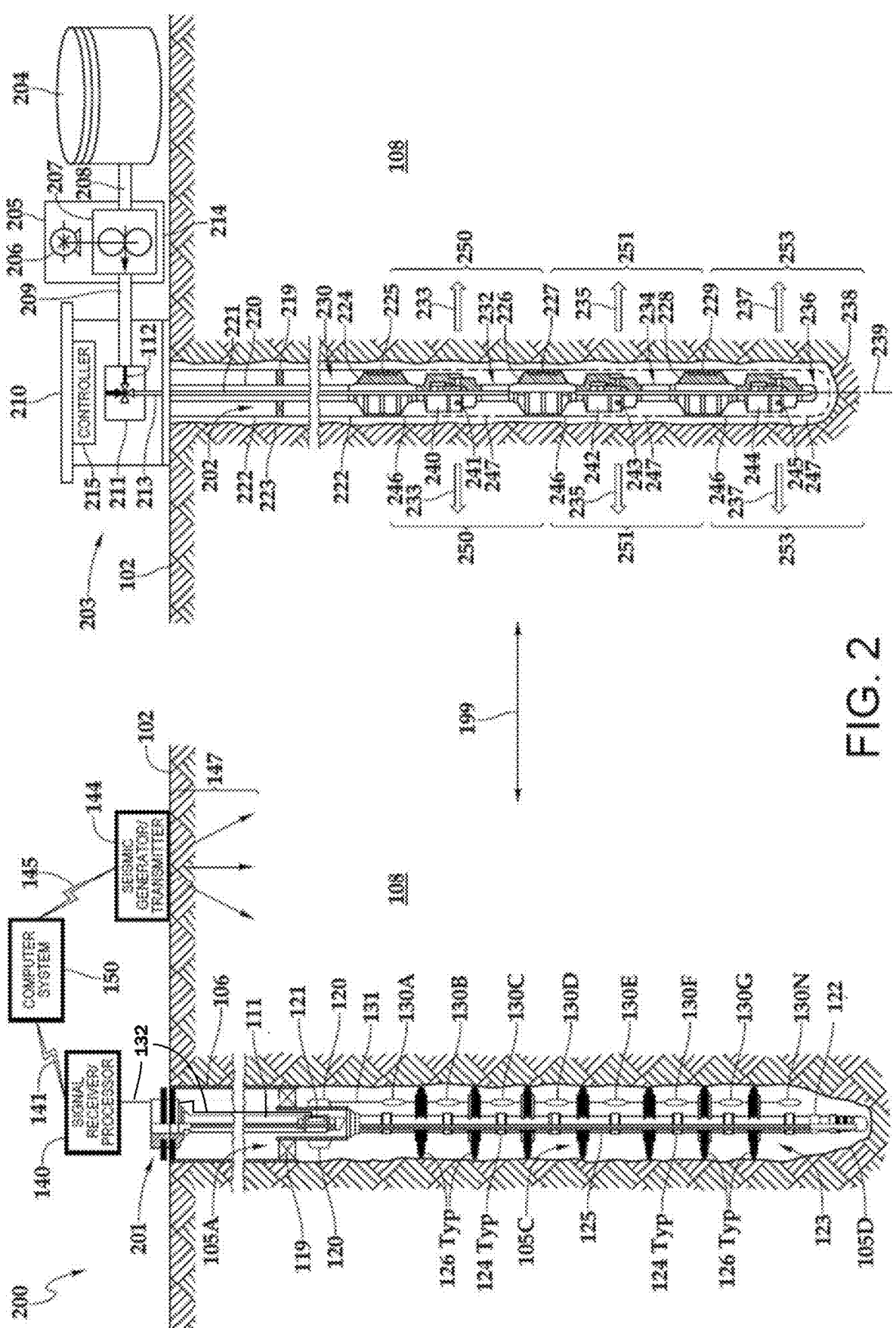
FIG. 2 illustrates a multi-wellbore system including well monitoring apparatus, according to various embodiments.

FIG. 2 illustrates a wellbore system (system) 200, including wellbore monitoring apparatus, according to various embodiments. A shown in FIG. 2, system 200 includes a first wellbore system 201 including upper wellbore 105A, and a second wellbore system 203 including wellbore 202. In various embodiments, at least wellbore system 203 is configured to perform fluid injection operations into formation 108, and wellbore system 201 is configured to perform monitoring operations, including monitoring activity related to the injection operation(s) being performed by wellbore system 203, as further described below. In various embodiments, wellbore system 201 may be configured for monitoring only. In other embodiments, wellbore system 201 may be configured to provide monitoring and also perform fluid injection operations.

Wellbore system 201 includes monitoring apparatus configured to monitor a fluid injection operation or operations being performed by wellbore system 203. Wellbore system 201 includes many of the same or similar components as illustrated and described above with response to FIG. 1 and system 100. These same or similar components are identified in FIG. 2 as was used to identify these components in FIG. 1. These same or similar components include a wellbore having an upper wellbore 105A coupled to a distal wellbore 105C of the wellbore. Upper tubing 111 extends through the upper wellbore 105A of wellbore, and distal tubing 125 extends through the lower wellbore 105C. Lower wellbore 105C may or may not include the packers 126 dividing the annulus surrounding the distal tubing 125 into injection zones, and may or may not include fluid control ports 124. Wellbore system 201 includes sensing devices 130A-130N positioned along distal tubing 125 in a manner the same as or similar to that described above with respect to FIG. 1 and system 100. In various embodiments sensing devices 130A-130N are positioned in an uncased portion of the wellbore. In alternative embodiment, sensing devices 130A-130N are positioned behind a lower casing provided within the lower wellbore 105C, and may be cemented in place behind the lower casing.

A communication line 131 is coupled to a lower transceiver 120 and configured to provide output signals generated by sensing devices 130A-130N to the lower transceiver. In a manner the same as or similar to that described above with respect to system 100 (FIG. 1), the lower transceiver 120 is inductively coupled to the intermediate transceiver 121. Intermediate transceiver 121 is communicatively coupled to the signal receiver/processor 140 by communication link 132. The signals sensed by sensing devices 130A-130N and transmitted by the inductive coupler positioned between the lower transceiver 120 and the intermediate transceiver 121 may be communicated to and processed by the signal receiver/processor 140 and computer system 150 in any manner described above with respect to system 100 and FIG. 1, or any equivalents thereof.

System 200 includes signal receiver/processor 140, computer system 150, and seismic generator/transmitter 144 as also described above with respect to FIG. 1 and system 100. These components as illustrated in FIG. 2 for system 200 may be configured to provide any of the features and to perform any of the functions described above with respect to system 100, with differences as further described below.

Differences between system 100 and wellbore system 201 include that wellbore system 201 as illustrated in FIG. 2 does not include an intermediate wellbore 105B, or a horizontal orientation to any of the sections of the wellbore. However, the illustration of wellbore system 201 as shown in FIG. 2 is a non-limiting and illustrative example, wherein other configurations for the wellbore, including horizontal and inclined orientation, along with branching arrangements, are contemplate for use with wellbore system 201.

As shown in FIG. 2, wellbore system 203 is configured for performing fluid injection into a formation 108 in the vicinity of wellbore system 201. Although described below with respect to a wellbore system configured to perform fluid injection of carbon dioxide into the formation, embodiments of the wellbore system 203 are not limited to operations involving carbon dioxide injection, and may include fluid injection operations including other types of gases having various chemical compositions, such as but not limited to injection of elemental hydrogen (H2) and/or injection of fluid provided to formation 108 through wellbore system 203 as part of one or more fracturing operations.

As shown in FIG. 2, wellbore system 203 includes various components including a storage reservoir or vessel 204, a fluid pump 205, and a wellhead 210 are located above surface 102, and proximate a wellbore 202 extending below surface 102 into a formation 108. Vessel 204 may be any type of vessel configured to contain the carbon dioxide that is to be injected into formation 108 using wellbore system 203 for permanent storage of the carbon dioxide in the formation. The use of the phrase "permanent storage" is not necessarily in reference to a particular timeframe, but refers to storage of the carbon dioxide without the intent to retrieve the carbon dioxide from the formation at some time in the future. The carbon dioxide contained in vessel 204 may have been produced from an oil and gas reservoir, generated for example as a result of a manufacturing process, or from some other man-made source, and was captured and placed in vessel 204 as an alternative to letting the carbon dioxide be emitted into the atmosphere. Wellbore system 203 is configured to take the carbon dioxide contained in vessel 204, and to inject the carbon dioxide into formation 108 for permanent storage within the formation, as further described below.

As illustrated in FIG. 2, vessel 204 is coupled to fluid pump 205 through fluid conduit 208, wherein fluid pump 205 is coupled to wellhead 210 through fluid conduit 209. In various embodiments, fluid pump 205 includes pump 207 configured to pump carbon dioxide provided through fluid conduit 208 to the wellhead 210 through fluid conduit 209. In various embodiments, pump 207 is powered by a pump driver, such as motor 206, which in various embodiments is an electric motor. The carbon dioxide provided to wellhead 210 is coupled through valve inlet 212 to one or more valves 211 configured to controllably couple a flow of fluid from the valve inlet 212 to the valve outlet 213.

A controller 215, which may comprise a computing device with one or more processors and other computing devices, such a computer memory, may be coupled to devices such as the one or more valves 211, and is configured to control the operation of the one or more valves 211. In various embodiments, controller 215 may also be configured to control the operation of the fluid pump 205 in order to regulate the pressure and/or the flow rate of carbon dioxide being provided to the wellhead 210 from vessel 204. In various embodiments, fluid pump 205 may further include temperature control devices 214, which may include heating elements and/or a chiller/compressor unit configured to heat or cool, respectively, the fluid being provided to the wellhead 210, via heating and/or cooling. Heating or cooling of the fluid, in conjunction with the use of fluid pump 205 to pressurize the fluid, may be controlled, in some embodiments by controller 215, in order to place the fluid into a desired and predetermined phase state for injection into the formation 108.

In wellbore system 203, valve outlet 213 is coupled to be in fluid communication with a downhole fluid tubing (tubing) 221, which extends down into wellbore 202 and is enclosed within a tubing string 220. Tubing string 220 includes a hollow center passageway through which downhole fluid tubing 221 extends. Tubing string 220 is also physically coupled to one or more packers and to one or more flow control valve assemblies, which tubing string 220 helps secure within the wellbore 202. As shown for wellbore system 203, tubing string 1220 extends from surface 102, and is positioned within and is encircled by upper casing 222, which also extends from surface 102 to some depth within wellbore 202 along a longitudinal axis 239 of the borehole. In various embodiments, at least some portion of the upper casing 222 may be encased in cement 223. In addition, one or more centralizers 219 may be positioned within the upper casing 222, the centralizers configured to extend between the inner surface of the upper casing 222 and an outer surface of the tubing string 220, and thus stabilize the tubing string with the upper casing.

In various embodiments, a packer 224 is positioned within upper casing 222 at some predetermined depth within wellbore 202, the packer coupled to tubing string 220 and encircled by a sealing element 225 the extends between the packer 224 and the inner surface of the portion of the upper casing 222 where the packer is positioned. A first flow control valve assembly (valve assembly) 240 is positioned downhole from packer 224, and is physically coupled to tubing string 220. Valve assembly 240 includes one or more flow control valves configured to control a flow of carbon dioxide through the valve assembly 240 and into formation 108 in the areas of the formation proximate to the location of valve assembly 240 within the wellbore 202. Packer 224, in conjunction with sealing element 225, provide isolation of an annulus 232, which surrounds the valve assembly 240, from annulus 230, which extends from surface 102 to the uphole side of packer 224 and encircles the tubing string 220 within upper casing 222.

Internal fluid passageways within valve assembly 240 are in fluid communication with downhole fluid tubing 221, wherein the one or more flow control valves are configured to controllably couple the internal fluid passageways of valve assembly 240 to one or more ports 241 of the valve assembly. As such, the one or more vapor-transition flow control valves of valve assembly 240 are configured to allow carbon dioxide that is received at the valve assembly from the downhole fluid tubing 221 to be controllably released through the one or more ports 241 and into annulus 232. The pressure of the carbon dioxide released into annulus 232 drives the carbon dioxide through perforations 247 extending along wellbore 202 in the vicinity of valve assembly 240, and out into formation 108, as illustratively represented by arrows 233. In various embodiments, only one valve assembly, such as valve assembly 240, is included in wellbore system 203, wherein the carbon dioxide released from port(s) 241 is configured to fill the borehole extending below packer 224, and to exit the borehole through one or more sets of perforations 247 for injection into formation 108.

In the alternative, in wellbore system 203 includes a plurality of valve assemblies. As shone in FIG. 2, wellbore 202 includes three sets of valves assemblies, 240, 242, and 244 are shown, the valve assemblies spaced apart from one another along the wellbore 202, and wherein each of the valve assemblies is surrounded by a respective annulus (232, 234, 236), which are isolated from one another by packers 226 and 228, and wherein the upper-most annulus 232 surrounding valve assembly 240 is isolated from the annulus 230 extending to surface 102 by packer 224. Each of the valve assemblies are in fluid communication with downhole fluid tubing 221, and thus are configured to receive a flow of fluid being provided from the surface 102 through downhole fluid tubing 221. As arranged wellbore system 203, fluid exit port(s) 241 of valve assembly 240 may be directed to perforations 247 adjacent to annulus 232, and further directed into formation 108 in a zone generally indicated as zone 250. Similarly, fluid exit port(s) 243 of valve assembly 242 may be directed to perforations 247 adjacent to annulus 234, and further directed into formation 108 in a zone generally indicated as zone 251, while fluid exit port(s) 243 of valve assembly 244 may be directed to perforations 247 adjacent to annulus 236, and further directed into formation 108 in a zone generally indicated as zone 253. As such, the arrangement of the valve assemblies and the packers isolating the annuluses surrounding the valve assemblies, respectively, may contribute to better control and dispersion of the fluid into formation 108 along the entirety of the wellbore system 203 designated for fluid injection.

The arrangement of valve assemblies and packers as shown in FIG. 2 for wellbore system 203 is one non-limiting example of a wellbore system, and other variations are possible and are contemplated for use in various embodiments of wellbore system 203. For example, the number of valve assemblies included in a particular wellbore system is not limited to a particular number of valve assemblies, and may include one or more valve assemblies. Examples of wellbore system 203 are not limited to having the valve assemblies positioned at a particular depth from surface 102, and may include valve assemblies positioned at varying depths, for example based on the location of a formation material that is determined to be useful for the storage of a fluid, such as carbon dioxide, within the formation material. In various embodiments, the valve assemblies that are included in a wellbore system may or may not be evenly spaced relative to one another along the wellbore, and may include groups of one or more valve assemblies that are spaced apart from another group of valve assemblies by a distance along the wellbore that is different from the spacing between other groups of valve assemblies.

In various embodiments of a wellbore system, a single packer may be used to isolate the annulus surrounding each of the valve assembles included in the wellbore system from the annulus extending to the surface of the wellbore system. In various embodiments, each of the valve assemblies included in a wellbore system may be isolated from the other valve assemblies included in the wellbore system by a set of packers positioned uphole and downhole from the location of each of the valve assembly. In various embodiments, a group of two or more valve assemblies may be isolated by a pair of packers so that the group of two or more valve assemblies is configured to be in fluid communication with a common annulus. These and other variations of the valve assembly and packer arrangements are possible and are contemplated for use in configurations of wellbore systems that may be utilized for fluid injection operations as described herein, and any equivalents thereof. Further, while wellbore 202 is shown as comprising a vertically oriented borehole, embodiments of wellbores where the valve assemblies may be deployed are not limited to wellbores having any particular orientation, and may include vertical, horizontal, and/or inclined wellbores, and combination of these, including wellbore systems including one or more branches coupled to a main, a secondary, or other network(s) of a wellbore.

In operation, carbon dioxide stored in vessel 204 is pumped to the wellhead 210 by fluid pump 205 in a phase state that is desirable for injection of the carbon dioxide into formation 108. In various embodiments, that desired state includes carbon dioxide in a high-density fluid phase. In various embodiments, the temperature of the fluid received from the vessel 204 may be altered by one or more temperature control devices 214 in order to allow the pump 207 to pressurize the fluid while allowing the fluid to be transformed into and/or maintained in a desired phase state for injection into formation 108. The high-density fluid carbon dioxide is coupled through valves 211 and into the downhole fluid tubing 221, where it passed through the downhole fluid tubing 221 and is provided to each of the valve assemblies 240, 242, 244.

When the carbon dioxide is provided to the valve assembles in the desired phase state, the one or more flow control valves included in the valve assemblies is/are configured to actuate to an "open" configuration, allowing the carbon dioxide to flow through or past the vapor-transition flow control valve(s), and exit through one or more of port(s) 241, 243, and/or 245, to a respective annulus, and then to flow through perforations 247 in the casing liner of the wellbore and into the formation 108. Arrows 233 represent the flow of carbon dioxide exit port(s) 241 of valve assembly 240 and flowing into formation 108 in zone 250. Arrows 235 represent the flow of carbon dioxide exit port(s) 243 of valve assembly 242, and flowing into formation 108 in zone 251. Arrows 237 represent the flow of carbon dioxide exiting port(s) 245 of valve assembly 244 and flowing into formation 108 in zone 253.

In a manner that same or similar to that described above, seismic generator/transmitter 144 is configured to generate and transmit seismic vibrations 147 into the formation 108, in some embodiments before, during, and/or after the fluid injection procedures being performed by wellbore system 203 are going to, are, and/or have been performed. During the time when seismic vibrations that have been generated in the formation by seismic generator/transmitter 144 are present, sensing devices 130A-130N may be configured to receive and detect these seismic vibrations, and to provide output signal(s) representative of the detected seismic vibrations. These output signals may be communicated, using inductive coupling between the lower transceiver 120 and the intermediate transceiver 121, to the computer system 150 through the signal receiver/processor 140, wherein the computer system 150 provides further processing of the received output signals to measure and determine various parameters associated with formation 108 and/or with the status of the fluid injection operation(s) being performed on the formation by wellbore system 203.

In various embodiments, the wellbore of wellbore system 201 is separate from the wellbore of wellbore system 203 by a distance 199. Distance 199 is not limited to a particular distance or particular range of distances, and in various embodiments may be in a range from 10 to 1000 feet, inclusive. Distance 199 may be determined based on one or more factors related to the seismic vibrations being provided by the seismic generator/transmitter 144 to the formation, and based on one or more known characteristics of the formation itself. In various embodiments, the location depth wise within the wellbore 105C and the relative spacing of the sensing devices 130A-130N relative to one another may be determined by factors such as the depth from the surface of the various valve assemblies provided as part of the fluid injection system of wellbore system 203. For example, the sensing devices 130A-130N may be positioned so that one or more particular ones of the sensing devices aligns depth wise from the surface with a corresponding one of the location(s) depth wise of the valve assemblies provided for fluid injection within wellbore system 203. Such arrangements may allow more precise monitoring of the seismic vibrations related to particular zones of fluid injection being performed by wellbore system 203.

In various embodiments, based at least in part on the output signals received at computer system 150 from the one or more sensing devices 130A-130N during fluid injection operations being performed by wellbore system 203, computer system 150 may generate instruction(s), which may then be communicated to controller 215 of wellbore system 203, for the purpose of modifying one or more operational parameters related to the fluid injection operations. For example, computer system 150 may instruct controller 215 to modify the pressure level and/or the temperature of the carbon dioxide being provided to the wellhead 210, or to shut off the wellhead in order to stop the injection of carbon dioxide altogether. Shutting off the fluid injection at wellbore system 203 may be instructed by computer system 150 for example when, based on signals detected by the sensing devices 130A-130N, a determination is made that the formation in the vicinity of wellbore system 203 will no longer support the injection of additional levels of carbon dioxide.

Advantages of using sensing devices in an observer ore monitoring well such as wellbore system 201 include but are not limited to:

Seismic data collected from multicomponent geophones can be used for monitoring of an injected CO2 plume.

Permanent installation of geophones arrays enables cost effective time-lapse seismic data acquisition which not only provide answers for CCUS application, but can be utilized for acquiring subsurface images using walkaway Vertical Seismic Profile (VSP) or anisotropy measurements using walkaround VSP.

Downhole seismic imaging/monitoring provides high resolution data as compared to surface monitoring.

Although the wellbore system 203 as described above is configured to use in fluid injection operations, system 203 may be configured for other and/or additional wellbore operations, such as a monitoring operation and/or as a production well. As a monitoring well, the one or more sensors may provide data regarding the reservoir in the area around the wellbore system 201 and/or 203, as well as parameters related to nearby injection operations. When utilized as a production well, the one or more sensors may be configured to provide data related to oil production, water cut, sand blockage at intake screens included as passageways, such as ports 124 when used as intakes to fluid passageway of the distal tubing 125. Control over any of the operations being performed by system 200, including control over various parameters such as fluid composition, fluid injection pressure, and/or fluid injection temperature, and/or starting and stopping various wellbore operations may be monitored, maintained, and/or adjusted based at least in part on the output signals and/or data derived from the output signal(s) provided by the one or more sensing devices 130A-130N.

Figure 3:
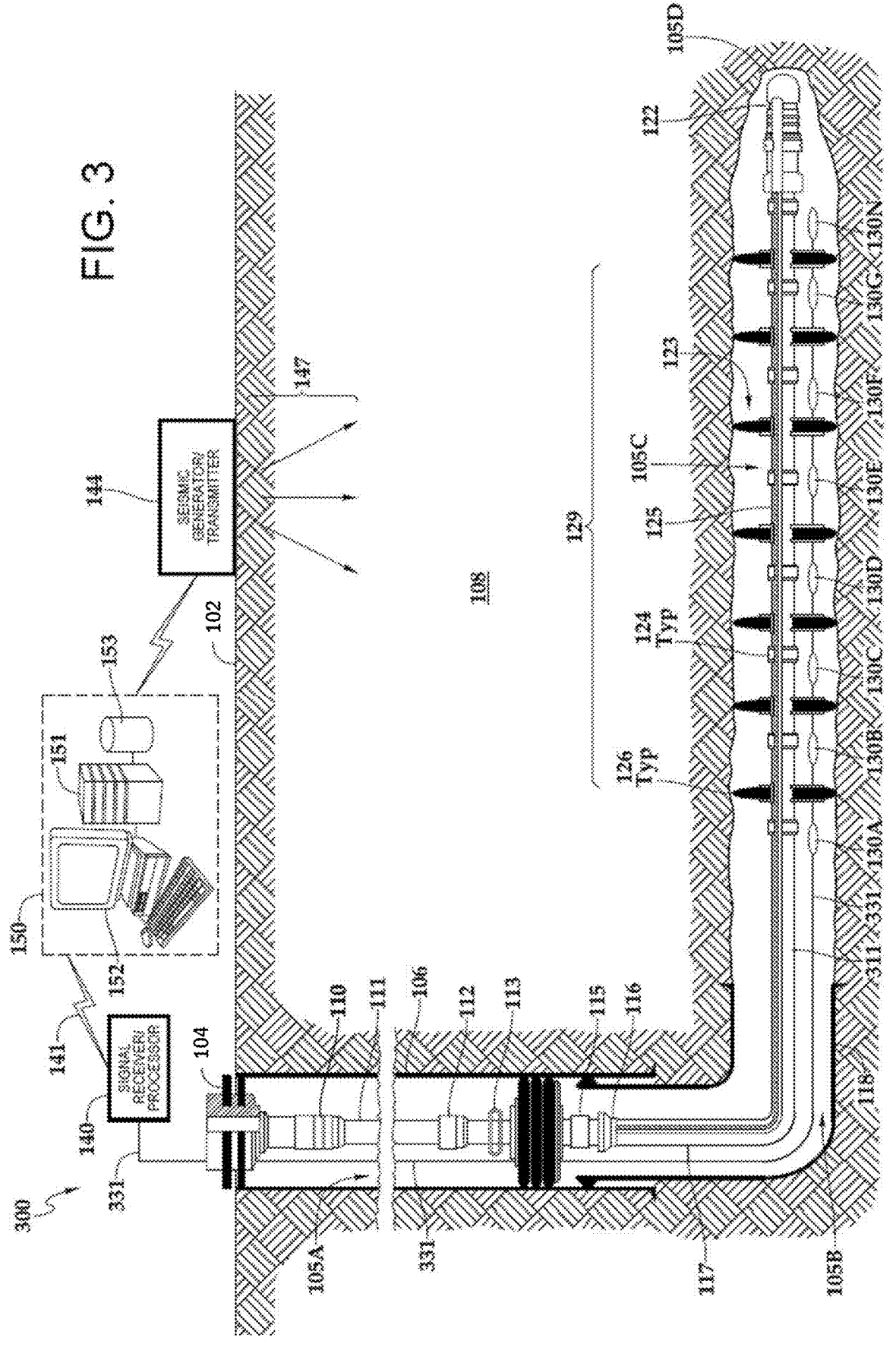
FIG. 3 illustrates a wellbore system including monitoring apparatus, according to various embodiments.

FIG. 3 illustrates a wellbore system (system) 300 including monitoring apparatus according to various embodiments. System 300 includes many of the same or similar components as illustrated and described above with response to FIG. 1 and system 100. These same or similar components are identified in FIG. 3 as was used to identify these components in FIG. 1. These same or similar components include a wellbore having an upper wellbore 105A coupled to an intermediate wellbore 105B of the wellbore, which in turn is coupled to a lower wellbore 105C. Upper tubing 111 extends through the upper wellbore 105A, intermediate tubing 117 extends through the intermediate wellbore 105B of the wellbore, and distal tubing 125 extends through the lower wellbore 105C. Lower wellbore 105C includes the packers 126 dividing the annulus 123 surrounding the distal tubing 125 into injection zones 129, fluid control ports 124 and sensing devices 130A-130N positioned along the outside of distal tubing 125 and in various ones of the injection zones 129, in a manner the same as or similar to that described above with respect to FIG. 1 and system 100. System 300 includes signal receiver/processor 140, computer system 150, and seismic generator/transmitter 144, also described above with respect to FIG. 1 and system 100. These components as illustrated in FIG. 3 for system 300 may be configured to provide any of the features and to perform any of the functions described above with respect to system 100, with differences as further described below.

Differences between system 100 (FIG. 1) and system 300 (FIG. 3) include that in system 300 the distal end of the intermediate tubing 117 is coupled directly to the proximal end of the distal tubing 125 without the use of coupler 127, and without the use of lower transceiver 120 and intermediate transceiver 121. Instead, and shown in FIG. 3 the signal line 331 that is coupled to the one or more sensing devices 130A-130N extends through the intermediate wellbore 105B and the upper wellbore 105A using a continuous connection or set of unbroken communication lines and connectors, such as an electrical or optical cable, without the use of any inductive coupling, to connect the sensing devices 130A-130N to the signal receiver/processor 140. In system 300, once the signal(s) have been received at the signal receiver/processor 140, any functions and/or features as described above with respect to system 100 related to the signal receiver/processor 140, computer system 150, and/or seismic generator/transmitter 144 may be performed by these devices as part of the operation of system 300, including monitoring of any fluid injection and/or fracturing procedures being performed using system 300. Control over any of the operations being performed by system 300, including control over various parameters such as fluid composition, fluid injection pressure, and/or fluid injection temperature, and/or starting and stopping various wellbore operations may be monitored, maintained, and/or adjusted based at least in part on the output signals and/or data derived from the output signal(s) provided by the one or more sensing devices 130A-130N.

Figure 4:
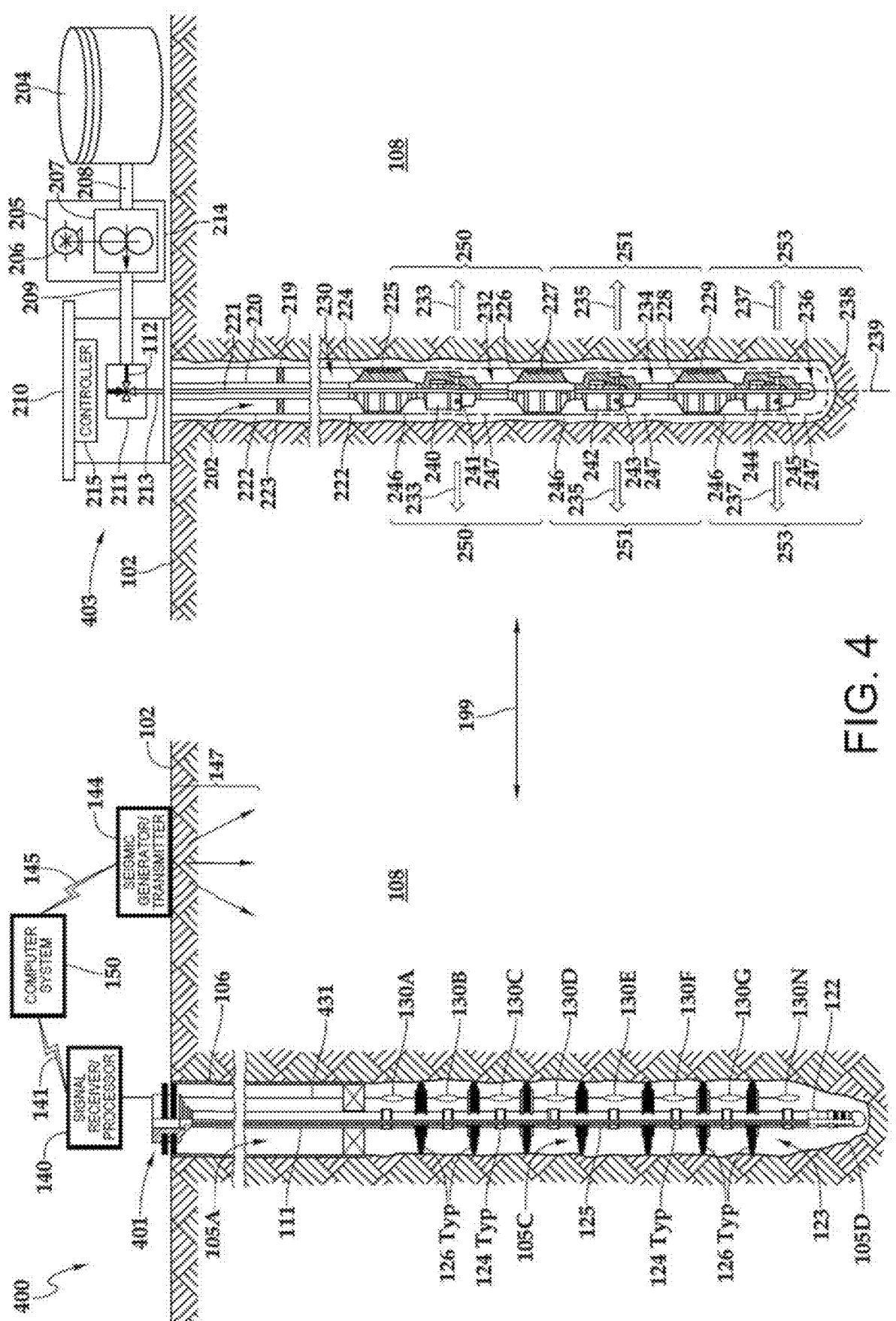
FIG. 4 illustrates a multi-wellbore system with well monitoring apparatus, according to various embodiments.

FIG. 4 illustrates a multi-well system (system) 400 with well monitoring, according to various embodiments. A shown in FIG. 4, system 400 includes a first wellbore system 401 including upper wellbore 105A, and a second wellbore system 403 including wellbore 202. In various embodiments, at least wellbore system 403 is configured to perform fluid injection operations into formation 108, and wellbore system 401 is configured to perform monitoring operations, including monitoring activity related to the injection operation(s) being performed by wellbore system 403, as further described below. In various embodiments, wellbore system 401 is configured to perform fluid injection operations in addition to monitoring operations.

Wellbore system 401 includes monitoring apparatus configured to monitor a fluid injection operations or operations being performed by wellbore system 403. Wellbore system 401 includes many of the same or similar components as illustrated and described above with response to FIG. 3 and system 300. These same or similar components are identified in FIG. 4 as were used to identify these corresponding components in FIG. 3. These same or similar components include a wellbore having an upper wellbore 105A coupled to a lower wellbore 105C. Upper tubing 111 extends through the upper wellbore 105A of wellbore, and distal tubing 125 extends through the lower wellbore 105C. Lower wellbore 105C may or may not include the packers 126 dividing the annulus surrounding the distal tubing 125 into injection zones, may or may not include fluid control ports 124. Wellbore system 401 includes sensing devices 130A-130N positioned along distal tubing 125 in a manner the same as or similar to that described above with respect to FIG. 3 and system 300. A communication link 431 is coupled to sensing devices 130A-130N, and provides a communication link for communicating the output signals from sensing devices 130A-130N to the signal receiver/processor 140. In a manner the same as or similar to that described above with respect to system 300 (FIG. 3), the signals sensed by sensing devices 130A-130N are transmitted to the signal receiver/processor 140 and to computer system 150 in any manner described above with respect to system 300 and FIG. 3, or any equivalents thereof.

System 400 includes signal receiver/processor 140, computer system 150, and seismic generator/transmitter 144 as also described above with respect to FIG. 1 and system 100.

These components as illustrated in FIG. 4 for system 400 may be configured to provide any of the features and to perform any of the functions described above with respect to system 300, with differences as further described below.

As was illustrated and described with respect to system 300 (FIG. 3) and wellbore system 401 as illustrated in FIG. 4 also does not include an intermediate wellbore 105B, or a horizontal orientation to any of the sections of the wellbore. However, the illustration of wellbore system 401 as shown in FIG. 4 is a non-limiting and illustrative example, wherein other configurations for the wellbore, including horizontal and inclined orientation, along with branching arrangements, are contemplate for use with wellbore system 201.

System 400 further includes wellbore system 403, which in various embodiments is configured as illustrated and described with respect to wellbore system 203 (FIG. 2), and may be configured to perform any of the functions and to provide any of the features described above with respect to wellbore system 203. In various embodiments, wellbore system 403 is configured to perform one or more fluid injection operations, including fluid injections and/or fracturing operations, on formation 108. In conjunction with system 403, wellbore system 401 is configured to monitor seismic vibrations generated and applied to formation 108 before, during, and/or after any of the fluid injection operations performed by wellbore system 403. The monitoring provided by wellbore system 401 may include any of the features and provide any of the functions ascribed to any of the well monitoring systems described herein, and any equivalents thereof.

Control over any of the operations being performed by system 400, including control over various parameters such as fluid composition, fluid injection pressure, and/or fluid injection temperature, and/or starting and stopping various wellbore operations may be monitored, maintained, and/or adjusted based at least in part on the output signals and/or data derived from the output signal(s) provided by the one or more sensing devices 130A-130N.

Figure 5:
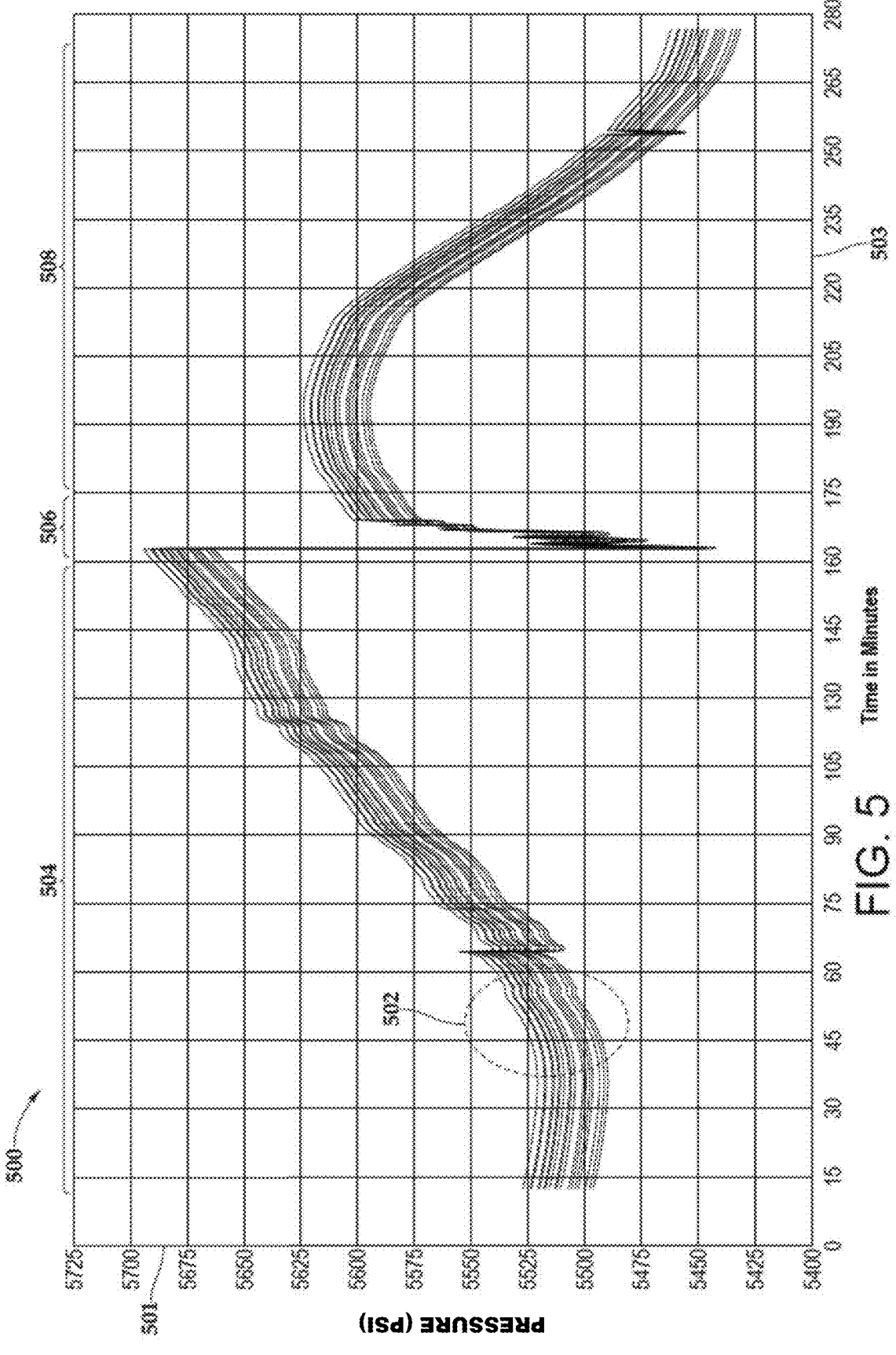
FIG. 5 illustrates a graph of seismic signals detecting using a plurality of downhole sensor devices included in a wellbore monitoring system.

FIG. 5 illustrates a graph 500 of seismic signals detecting using a plurality of downhole sensor devices included in a wellbore monitoring system. Graph 500 includes a vertical axis 501 representing downhole pressure in pounds/square inch (PSI). and a horizontal axis 503 representing time in minutes. Sensor signals 502 represent the individual sensed level of pressure detected by twenty five sensing devices when positioned downhole and outside of a fluid tubing during a fluid injection procedure being performed by a fluid injection system on a wellbore where the seismic sensors were located. The pressure sensors are communicatively coupled along a same single communication link that may be used to communicate other sensor output signals, such as output signals provided by geophones and/or hydrophones.

As shown in FIG. 5, during the time period between time 15 and 160, as generally represented by bracket 504, the level of the detected pressures rises from between a range of 5500 to 5525 to a range of between 5560 and 5700. Just after time 160, there is a sharp drop in the level of pressures detected, in some instances to a level below 5450 for dome of the sensors, as generally indicated by bracket 506. At around time 165, the level of the detected pressures recovers to a range from 5575 to 5625, with a slight rise and then a curved shaped all to a range of between 5425 and 5475 for all the sensors over the time period extending from abut time 165 to time 265, as generally indicated by bracket 508. The information provided by the signals represented in graph 500 are useful for deterring such things as a status of a fluid injection procedure being performed at the wellbore where the sending devices are located and/or at other wellbores in the area of where the wellbore including the sensing devices is located. In various embodiments the pressure sensors providing the pressure signals illustrated in FIG. 5 may be included as part of the sensing devices 130A-130N as illustrated and described with respect to systems 100, 200, 300, and/or 400 above.

Figure 5A:
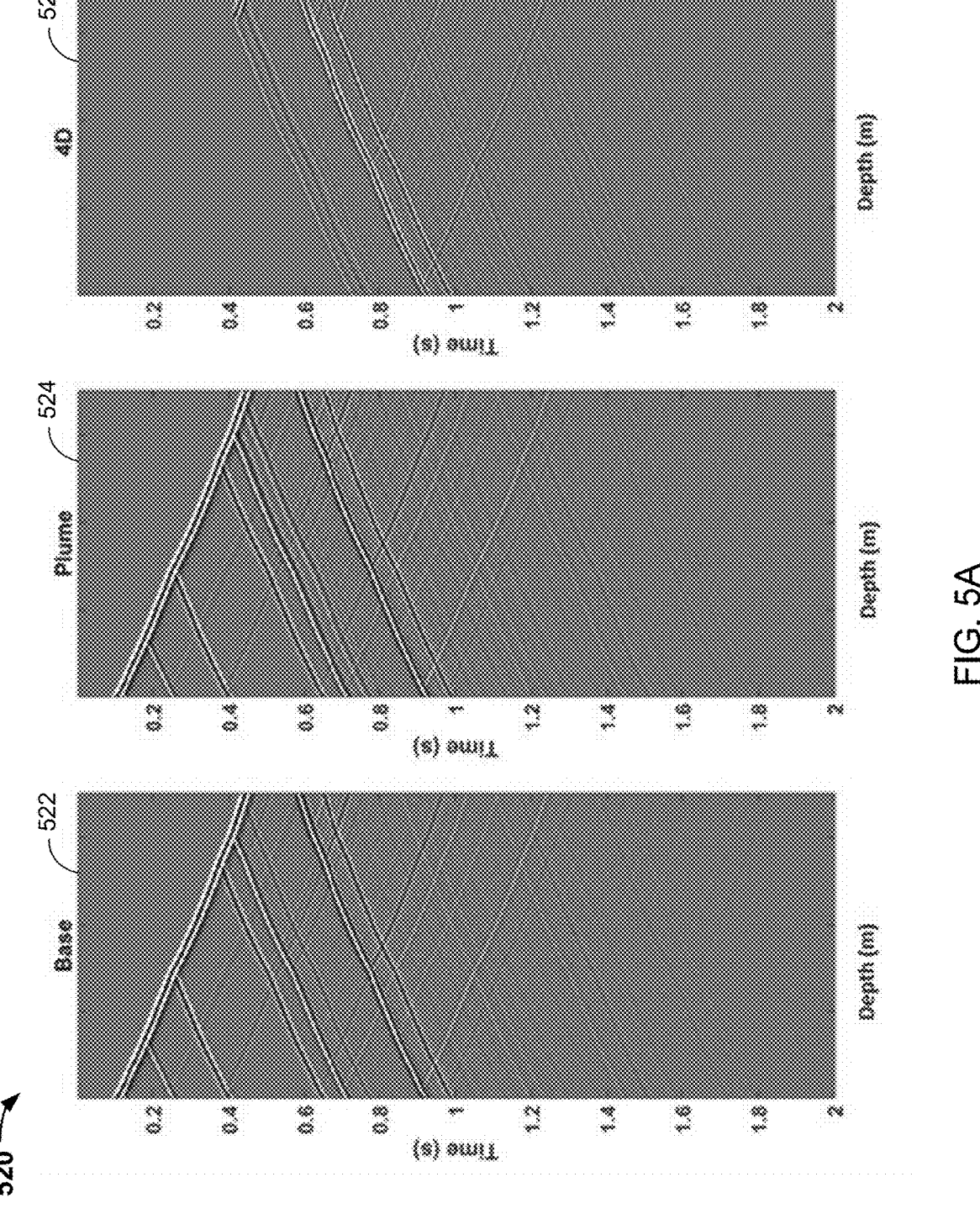
FIG. 5A illustrates a set of graphs of time versus depth of seismic data, according to various embodiments.

FIG. 5A illustrates a set of graphs 520 of time versus depth of seismic data, according to various embodiments. Embodiments of wellbore systems 100, 200, 300, and/or 400, as illustrated and described above with respect to FIGS. 1, 2, 3, and 4, may be configured to sense, collect, and analyze seismic data as illustrated in graphs 520. Graphs 520 include three individual graphical depictions of seismic data, labeled as left graph 522, middle graph 524, and right graph 526 in FIG. 5. In each of these graphical depictions, the vertical axis represents time in seconds, and the horizontal graph represent depth in meters. Left graph 522 shows a Time vs Depth Plot of a Seismic data set (synthetic data) taken as a baseline reference during CO2 Injection program. Middle graph 524 shows seismic data set repeated after a certain volume of CO2 injection has occurred, which corresponds to 8-10% drop of acoustic impedance (in same synthetic data set of left graph 522). The right graph 526 shows a plot of the seismic data after subtracting baseline data (left graph 522) from time lapse CO2 plume data (middle graph 524), wherein right graph 526 illustrates tangible changes in the data set corresponding to CO2 plume. This data is illustrative of an embodiment of one possible monitoring technique of CO2 injection using down-hole geophone arrays and/or other sensing devices as described herein.

Figure 6:
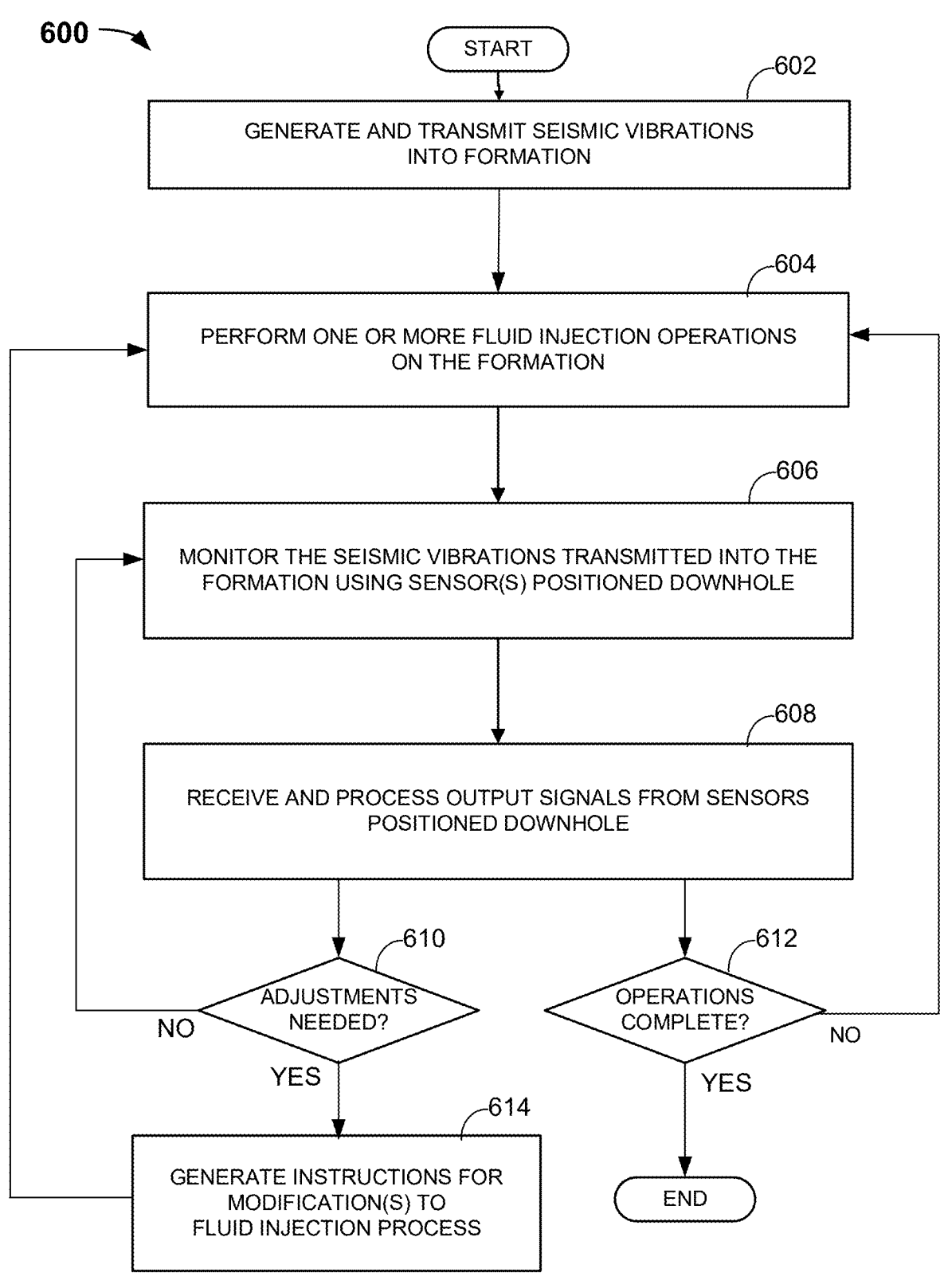
FIG. 6 illustrates a flowchart of one or more methods according to various embodiments.

FIG. 6 illustrates a flowchart of one or more methods 600 according to various embodiments. Embodiments of method 600 may be performed by a wellbore system, such as wellbore systems 100, 200, 300, and/or 400, as illustrated and described above with respect to FIGS. 1, 2, 3, and 4.

Embodiments of method 600 include generating and transmitting seismic vibrations into a formation (block 602). The generation and transmission of seismic vibrations into the formation may be provided by a seismic generator/transmitter, such as seismic generator/transmitter 144 (FIGS. 1-4), operable to transmit seismic vibrations (147, FIGS. 1-4) into the surrounding formation. In various embodiments, control over the operation of the seismic generator/transmitter may be based on instructions provided by a computer system (e.g., computer system 150, FIGS. 1-4; computer system 700, FIG. 7), and the instructions may be provided based on the processing of one or more sensor signals received at the computer system from one or more downhole sensing devices (sensing devices 130A-130N, FIGS. 1-4).

Embodiments of method 600 include performing one or more fluid injection operations on the formation, (block 604). The one or more fluid injection operations may be performed by any of the wellbore systems 100, 200, 300, and/or 400 as described above. In various embodiments, the fluid injection operation's include injection of carbon dioxide into a formation. In various embodiments, the fluid injection operation's include injection of a commodity such as but not limited to elemental hydrogen (H2) into a formation or into a subterranean cavity.

Embodiments of method 600 include monitoring, using a plurality of sensing devices, the seismic vibrations transmitted into the formation, (block 606). The monitoring operations may be performed by any of the wellbore systems 100, 200, 300, and/or 400 as described above. In various embodi-ments, one or more of the sensing devices utilized to sense the seismic vibrations includes a geophone. In various embodiments, one or more of the sensing devices utilized to sense the seismic vibrations includes a hydrophone. In various embodiments, one or more of the sensing devices includes quartz pressure and temperature sensors, acoustic sensors, and/or water cut sensors. In various embodiments, the one or more sensing devices may be communicatively coupled together using a single communication line as a communication link to one or more other devices such as a signal processor/receiver and/or a computer device located above the surface. In various embodiments the signal com-munication line is coupled to the one or more other devices through an inductive couple located downhole within the wellbore.

Monitoring includes generating, by one or more of the sensing devices, output signals representative of the detected seismic vibrations. The output signals in various embodi-ments are communicated to a computer system, such as computer system 150 (FIGS. 1-4) using an inductive cou-pling.

Embodiments of method 600 include receiving and pro-cessing the output signals representative of the detected seismic vibrations, (block 608). In various embodiments, the output signals are first received at a signal receiver/proces-sor, such as signal receiver/processor 140 (FIGS. 1-4). Signal processing performed by the signal receiver/proces-sor may include but is not limited to signal amplification, noise and frequency filtering, and/or analog to digital signal conversion. In various embodiments, a computer system receives the output signals, either directly from the sensing devices or from a signal receiver/processor, and further processes the received signals to generate data and infor-mation about the formation and/or the fluid injection pro-cedure being performed on the formation.

Embodiments of method 600 include a decision by the computer system, based at least in part on the data and information derived from sensing devices and/or the signal receiver/processor, as to the need to make adjustments to the fluid injection process being monitored by the one or more sensing devices, (block 610). If the decision is that no adjustments are needed, (the "NO" branch extending from decision block 610), then embodiments of method 600 including returning to block 606, and continuing to monitor the seismic vibrations being transmitted into and through the formation. If the decision made is that adjustments are needed, (the YES" branch extending from decision block 610), then embodiments of method 600 including proceed-ing to block 614.

At block 614, embodiments of method 600 include gen-erating, for example using the computer system, instructions for modifications to be made to the fluid injection operation that is being monitored. Examples of instructions to modify the fluid injection operation may include but are not limited to instruction to modify the fluid pressure, flow rate, and/or a temperature of the fluid being injected into the wellbore system that is being monitored. Examples of instructions to modify the fluid injection operation may include instructions to stop the fluid injection process. Once the instructions have been generated, embodiments of method 600 include return-ing to block 604 and proceeding with the one or more fluid injection operations using the parameters and/or procedures based on the new instructions to modify the fluid injection operation.

Returning to block 608, embodiments of method 600 include a decision by the computer system, based at least in part on the data and information derived from sensing devices and/or the signal receiver/processor, as to whether the fluid injection operation has been completed (block 612). A decision that the fluid injection operation has been completed may occur for example when it has been determined that no additional fluid can be or should be injected into the formation. If the decision at block 612 is that the fluid injection operation is not complete, (the "NO" branch extending from decision block 612), then embodiments of method 600 including proceeding to block 604, i.e., proceed with performing one or more fluid injection operations. If the decision at block 612 is that the fluid injection operation is complete, (the "YES" branch extending from decision block 612), then embodiments of method 600 proceed to the end.

Figure 7:
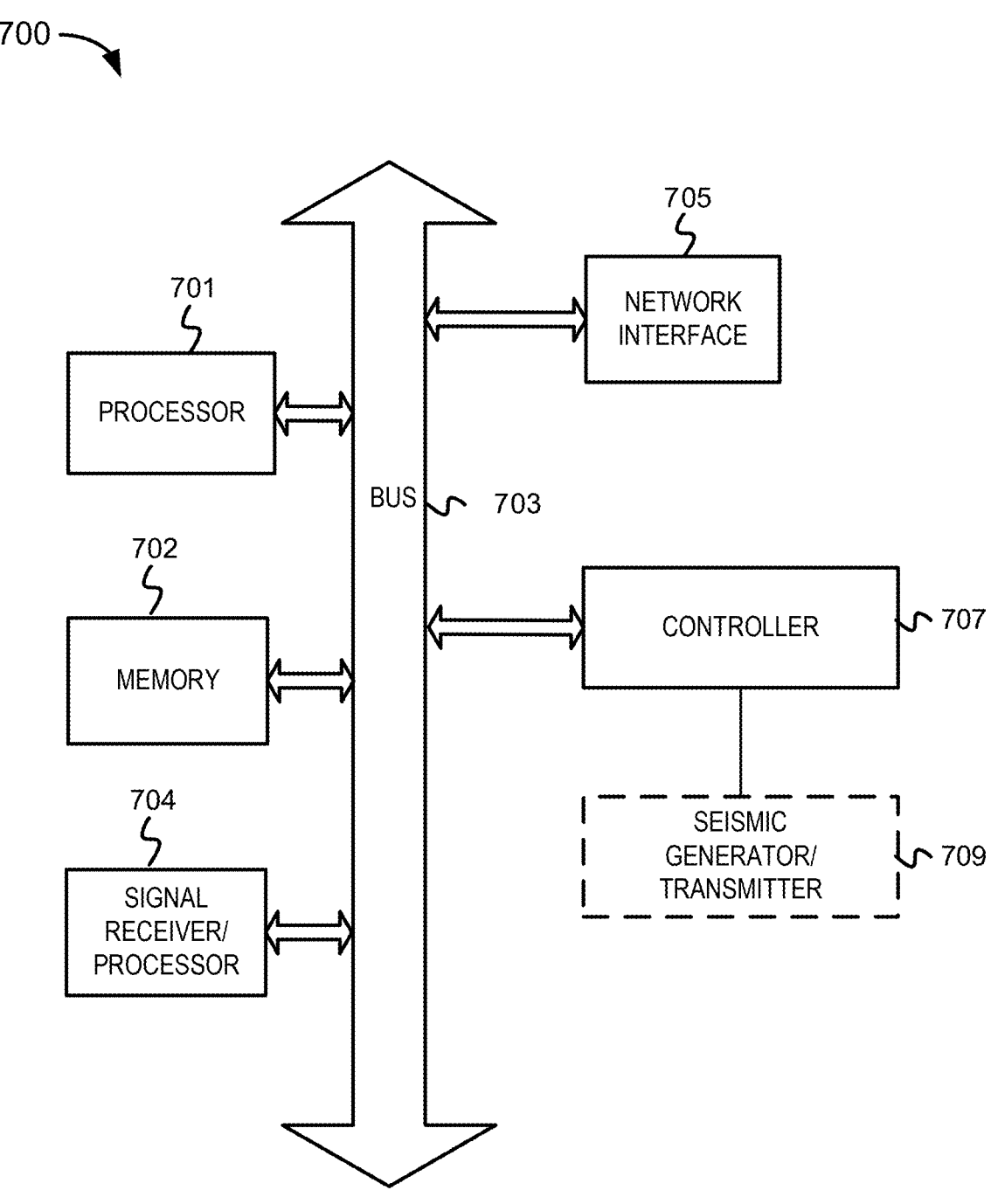
FIG. 7 illustrates a block diagram of an example computer system that may be employed to practice the concepts, methods, and techniques as disclosed herein, and variations thereof.

FIG. 7 illustrates a block diagram of an example computer system 700 that may be employed to practice the concepts, methods, and techniques as disclosed herein, and variations thereof.

Embodiments of computing system 700 that may be employed to practice the concepts, methods, and techniques as disclosed herein, and variations thereof. Computing system 700 includes a plurality of components of the system that are in electrical communication with each other, in some examples using a bus 703. Embodiments of computing system 700 may include any suitable computer, micro-controller, or data processing apparatus capable of being programmed to carry out the methods and for controlling apparatus as described herein. In various embodiments, one or more components illustrated and described with respect to computing system 700 may be included in computer system 150 as illustrated and described above with respect to FIGS. 1-4, and/or as illustrated as controller 215 as included in FIGS. 2 and 4

Referring back to FIG. 7, computing system 700 may be a general-purpose computer, and includes a processor 701 (possibly including multiple processors, multiple cores, multiple nodes, and/or implementing multi-threading, etc.). The computing system 700 includes memory 702. Memory 702 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the possible realizations of machine-readable media configured to store data and/or program instructions in an electronic format. The computer system 700 also includes the bus 703 (e.g., PCI, ISA, PCI-Express, HyperTransport® bus, InfiniBand® bus, NuBus, etc.) and a network interface 705 (e.g., a Fiber Channel interface, an Ethernet interface, an internet small computer system interface, SONET interface, wireless interface, etc.). Bus 703 may be configured to provide communications between any of the devices included in computing system 700. As illustrated in FIG. 7, the processor 701 and the network interface 705 are coupled to the bus 1403.

Although illustrated as also being coupled to the bus 703, the memory 702 may be coupled to the processor 701 only, or both processor 701 and bus 703. In some examples, memory 702 includes non-volatile memory and can be a hard disk or other types of computer readable media which can store data and program instructions that are accessible by a computer, such as magnetic cassettes, flash memory cards, solid state memory devices, digital versatile disks (DVDs), cartridges, RAM, ROM, a cable containing a bit stream, and hybrids thereof. Network interface 705 may be configured to provide communications between computing system 700 and other computing devices, such as remote computing system located away from the site of the well-bore.

Embodiments of computing system 700 may include signal receiver/processor 704, which is communicatively coupled to bus 703. Signal receiver/processor 704 maybe coupled to downhole sensors, such as but not limited to sensing devices 130A-130N as described above, the signal receiver/processor 704 configured to provide any of the features and to perform any of the functions ascribed to signal receiver/processor 140 as described above, and any equivalents thereof.

Embodiments of computing system 700 includes controller 707. In various embodiments, controller 707 is coupled to bus 1403, and may be configured to perform any of the functions and to provide any of the features ascribed to computer system 150 related to control of the operation of seismic generator/transmitter 144 as described above, and any equivalents thereof. For example, controller 707 may provide instructions and/or operating parameters for controlling the generation and transmission of seismic vibrations 147 (FIGS. 1, 2, 3, and 4) provided by seismic generator/transmitter 144. In various embodiments, control of the seismic generator/transmitter 144 may be based on information determined by processor 701 and based at least in part on the signals received at the signal receiver/processor 704 from one or more sensing devices, such as but not limited to sensing device 130A-130N (FIGS. 1, 2, 3, and 4). In various embodiments, controller 707 is configured to provide any of the features and to perform any of the functions ascribed to controller 215 (FIGS. 2 and 4), including controlling operations related to the fluid injection procedures being performed on any of the wellbore systems as described herein, and any equivalents thereof.

Embodiments of processing systems that can combine data collected by seismic data collected by Geophones and other sensors including Hydrophones to create an understanding of downhole parameters and properties. In various embodiments neural networks will be used to constantly improve the downhole reservoir model based on real time data received from the downhole sensor data. Various embodiments include the use of Artificial Intelligence (AI) to develop models of the reservoir and or the sensor data. Any of these functions may be performed by processor 701 in conjunction with instructions and/or programming that may be stored in memory 702 or otherwise available to processor 701.

It will be understood that one or more blocks of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus. As will be appreciated, aspects of the disclosure may be embodied as a system, method or program code/instructions stored in one or more non-transitory machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine. While depicted as a computing system 1400 or as a general purpose computer, some embodiments can be any type of device or apparatus to perform operations described herein.

As will be appreciated, aspects of the disclosure may be embodied as a system, method or program code/instructions stored in one or more non-transitory machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, which employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

While the aspects of the disclosure are described with reference to various implementations and exploitations, it will be understood that these aspects are illustrative and that the scope of the claims is not limited to them. In general, techniques for monitoring fluid injection procedures as described herein may be implemented with facilities consistent with any hardware system or hardware/software systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Example Embodiments

Non-limiting example embodiments include the following:

Embodiment 1. A system comprising: a fluid injection tubing positioned downhole within a wellbore and having a least some portion of the fluid injection tubing positioned within a portion of the wellbore and surrounded by an annulus extending between an outer surface of the fluid injection tubing and an exposed portion of a formation within the wellbore; and a plurality of sensing devices position within the wellbore and outside of the outer surface of the portion of the fluid injection tubing that is positioned within the wellbore, the plurality of sensing devices communicatively coupled to a single communication line, wherein at least one of the plurality of sensing devices is configured to sense seismic vibrations transmitted into and passing through the formation, and to provide one or more output signals representative of the sensed seismic vibrations.

Embodiment 2. The system of embodiment 1, wherein the one or more sensing devices include at least one geophone.

Embodiment 3. The system of embodiment 1 or 2, wherein the one or more sensing devices include at least one hydrophone.

Embodiment 4. The system of any one of embodiments 1-3, further comprising: an inductive coupler configured to inductively couple the one or more output signals provided by the plurality of sensing devices to a computer system located above a surface for the formation.

Embodiment 5. The system of any one of embodiments 1-4, wherein the plurality of sensing devices includes at least one geophone and at least one additional sensing device other than a geophone.

Embodiment 6. The system of any one of embodiments 1-5, further comprising a plurality of fluid control ports distributed along a length of the fluid injection tubing, the fluid injection tubing including a set of packers that isolates the plurality of fluid control ports into individual and separate injection zones, and wherein at least one of the one or more sensing devices is positioned within each of the separate injection zones.

Embodiment 7. The system of any one of embodiments 1-6, wherein the one or more output signals representative of the sensed seismic vibrations are configured to be communicated to a computer system using a communication link that is also configured to allow for an interrogation to be performed of one or more quartz or other sensors located downhole in the wellbore.

Embodiment 8. The system of any one of embodiments 1-7, wherein the system is configured to inject carbon dioxide into the formation.

Embodiment 9. The system of any one of embodiments 1-8, further comprising a seismic generator/transmitter that is configured to general generate seismic vibrations and to transmit the generated seismic vibrations into the formation.

Embodiment 10. A multi-wellbore system comprising: a first wellbore configured to perform one or more fluid injection operations to inject a fluid into a subterranean formation; a second wellbore extending into the subterranean formation and separated from the first wellbore by a distance consisting of consisting a portion of the subterranean formation; and a plurality of sensing devices position within a portion of the second wellbore and outside of an outer surface of a portion of the fluid tubing positioned within the wellbore, the plurality of sensing devices communicatively coupled to a single communication line, wherein at least one of the plurality of sensing devices is configured to sensing devices configured to sense seismic vibrations transmitted into and passing through the subterranean formation, and to provide one or more output signals representative of the sensed seismic vibrations.

Embodiment 11. The multi-wellbore system of embodiment 10, wherein at least one of the one or more sensing devices comprises a geophone.

Embodiment 12. The multi-wellbore system of embodiment 10 or 11, wherein the first wellbore is configured to inject carbon dioxide into the subterranean formation.

Embodiment 13. The multi-wellbore system of any one of embodiments 10-12, wherein plurality of sensing devices includes at least one geophone and at least one additional sensing device other than a geophone.

Embodiment 14. The multi-wellbore system of any one of embodiments 10-13, wherein the second wellbore comprises an inductive coupler configured to inductively couple the one or more output signals provided by the one or more sensing devices to a computer system located above a surface for the subterranean formation.

Embodiment 15. A method comprising: generating and transmitting seismic vibrations into a subterranean formation; performing, using a wellbore system, one or more fluid injection operations to inject a fluid into the subterranean formation; detecting, using one or more sensing devices, the seismic vibrations transmitted into and passing through the subterranean formation, wherein the one or more sensing devices are positioned in a section of the wellbore system that extends into the subterranean formation and which is outside of a fluid tubing located with the section of the wellbore; and outputting, from the one or more sensing devices and using a single communication line that is communicatively coupled to the one or more sensing devices, one or more output signals representative of the detected seismic vibrations.

Embodiment 16. The method of embodiment 15, wherein at least one of the one or more sensing devices comprises a geophone.

Embodiment 17. The method of embodiment 15 or 16, wherein the fluid being injected is carbon dioxide.

Embodiment 18. The method of any one of embodiments 15-17, wherein the wellbore system comprises a first wellbore configured to perform the fluid injection operation(s), and a second wellbore that is separated from the first wellbore by a distance consisting of formation where the one or more sensing devices are located.

Embodiment 19. The method of any one of embodiments 15-18, wherein the wellbore system comprises a single wellbore having one or more borehole orientation, the single wellbore configured to perform the fluid injection operation(s) and also includes an uncased section of the wellbore system where the one or more sensing devices are located.

Embodiment 20. The method of any one of embodiments 15-19, wherein outputting the one or more output signals representative of the detected seismic vibrations comprises coupling the one or more sensing devices to a computer system located above the subterranean surface using an inductive coupler.

What is claimed is:

1. A system comprising:
a fluid injection tubing positioned downhole within a wellbore, wherein at least some portion of the fluid injection tubing is positioned within a casing, the casing surrounded by an annulus extending between an outer surface of the casing and an exposed portion of a formation within the wellbore; and
one or more first sensing devices positioned along the outer surface of the casing or between the casing and the formation, wherein the one or more first sensing devices are communicatively coupled to a single communication line, and wherein at least one of the one or more first sensing devices is configured to sense seismic vibrations transmitted into and passing through the formation and to provide one or more output signals representative of the sensed seismic vibrations.

2. The system of claim 1, wherein the one or more first sensing devices include at least one geophone.

3. The system of claim 1, wherein the one or more first sensing devices include at least one hydrophone.

4. The system of claim 1, further comprising an inductive coupler configured to inductively couple the one or more output signals provided by the one or more first sensing devices positioned relative to the casing to a computer system located above a surface of the wellbore.

5. The system of claim 1, further comprising:
one or more second sensing devices, wherein the one or more first sensing devices includes at least one geophone and the one or more second sensing devices include at least one additional sensing device other than a geophone.

6. The system of claim 1, further comprising a plurality of fluid control ports distributed along a length of the fluid injection tubing, the fluid injection tubing including a set of packers that isolates the plurality of fluid control ports into individual and separate injection zones, and wherein at least one of the one or more first sensing devices is positioned within each of the separate injection zones.

7. The system of claim 1, wherein the one or more output signals representative of the sensed seismic vibrations are configured to be communicated to a computer system using a communication link that is also configured to allow for an interrogation to be performed of one or more second sensing devices, wherein the computer system uses a uniform communication protocol across the one or more first sensing devices and the one or more second sensing devices, wherein the one or more second sensing devices include one or more quartz or other sensors located downhole in the wellbore, wherein the one or more second sensing devices are different from the one or more first sensing devices.

8. The system of claim 1, wherein the system is configured to inject carbon dioxide into the formation.

9. The system of claim 1, further comprising a seismic generator/transmitter that is configured to generate seismic vibrations and to transmit the generated seismic vibrations into the formation.

US 12,644,360 B2

25

10. A method comprising:

generating and transmitting seismic vibrations into a subterranean formation;

performing, using a wellbore system including a fluid injection tubing, one or more fluid injection operations to inject a fluid into the subterranean formation, wherein the fluid injection tubing is positioned within a casing in a wellbore;

detecting, using one or more sensing devices, the seismic vibrations transmitted into and passing through the subterranean formation, wherein the one or more sensing devices are positioned along an outer surface of the casing or between the casing and the subterranean formation; and outputting, from the one or more sensing devices and using a single communication line that is communicatively coupled to the one or more sensing devices, one or more output signals representative of the detected seismic vibrations.

11. The method of claim 10, wherein at least one of the one or more sensing devices comprises a geophone.

12. The method of claim 10, wherein the fluid being injected is carbon dioxide.

13. The method of claim 10, wherein the wellbore system comprises a single wellbore having one or more borehole orientations, the single wellbore configured to perform the fluid injection operation(s).

14. The method of claim 10, wherein outputting the one or more output signals representative of the detected seismic vibrations comprises coupling the one or more sensing devices positioned outside of the casing to a computer system located above a surface of the wellbore system using an inductive coupler.

\* \* \* \* \*